(12) United States Patent
Packingham (10) Patent No.: US 10,473,349 B2
(45) Date of Patent: Nov. 12, 2019

(54) ADAPTIVE MAKEUP AIR SYSTEM AND METHOD FOR TIGHT ENCLOSURES

(71) Applicant: Systemair Mfg. Inc., Lenexa, KS (US)

(72) Inventor: Gary Packingham, Cleveland, MO (US)

(73) Assignee: Systemair Mfg. Inc., Lenexa, KS (US)

( * ) Notice: Subject to any disclaimer, the term of this patent is extended or adjusted under 35 U.S.C. 154(b) by 605 days.

(21) Appl. No.: 14/954,443

(22) Filed: Nov. 30, 2015

(65) Prior Publication Data

US 2016/0273791 A1   Sep. 22, 2016

Related U.S. Application Data

(60) Provisional application No. 62/134,346, filed on Mar. 17, 2015.

(51) Int. Cl.
*F24F 11/00* (2018.01)
*F24F 11/30* (2018.01)
(Continued)

(52) U.S. Cl.
CPC .............. *F24F 11/30* (2018.01); *F24F 7/08* (2013.01); *F24F 11/77* (2018.01);
(Continued)

(58) Field of Classification Search
CPC ........ G01M 1/38; G05D 23/19; F16L 55/033; F16L 55/02; F16L 59/02; F16L 11/04;
(Continued)

(56) References Cited

U.S. PATENT DOCUMENTS 4,357,806 A * 11/1982 Harris .................. F24F 3/0442
236/49.3
5,292,280 A * 3/1994 Janu ......................... F24F 7/08
454/229

(Continued)

OTHER PUBLICATIONS

2012 International Mechanical Code. International Code Council. Nov. 2014 [retreived on Nov. 7, 2018]. Retreived from the Internet: <URL: https://codes.iccsafe.org/content/IMC2012/chapter-4-ventilation>.*

(Continued)

*Primary Examiner* — Vivek K Shirsat
*Assistant Examiner* — Ryan L Faulkner
(74) *Attorney, Agent, or Firm* — Hovey Williams LLP (57) ABSTRACT

A system and method for introducing external air into an enclosure having an exhaust fan for removing internal air at an outflow rate. A sensor measures a quantifiable characteristic which is indicative of the outflow rate. Based on the measured quantifiable characteristic, a controller determines a speed of a makeup air fan that results in the inflow rate matching the outflow rate, and opens a damper and runs the makeup air fan at the determined speed. For example, the sensor may measure an amount of electrical current flowing to the exhaust fan, and low and high speed exhaust fan values are stored in a memory, and corresponding low and high makeup air fan speeds are set. The controller then controls operation of the makeup air fan based on the amount of current flowing to the exhaust fan and the corresponding makeup air fan speed to match the inflow and outflow rates.

19 Claims, 4 Drawing Sheets (51) Int. Cl.
    *F24F 7/08*    (2006.01)
    *F24F 11/77*   (2018.01)
    *F24F 110/00*  (2018.01)
    *F24F 110/30*  (2018.01)
(52) U.S. Cl.
    CPC ... *F24F 2011/0002* (2013.01); *F24F 2110/00* (2018.01); *F24F 2110/30* (2018.01)
(58) Field of Classification Search
    CPC .... F16L 11/12; F16L 11/10; F16L 9/00; F16L 9/21; F24F 11/00; F24F 3/044; F24F 7/08; H02P 7/06
    USPC ........ 454/239, 228; 700/276, 278; 236/49.3, 236/1 C
    See application file for complete search history.

(56) References Cited

U.S. PATENT DOCUMENTS

| | | | | |
|---|---|---|---|---|
| 5,795,634 A * | 8/1998 | Fukui | ........................ | B32B 1/08 428/36.1 |
| 6,179,009 B1 * | 1/2001 | Fukui | ........................ | F16L 9/21 138/129 |
| 6,467,696 B2 * | 10/2002 | Riley | ................... | F24F 11/0017 236/49.3 |
| 6,609,967 B2 * | 8/2003 | Sharp | ................... | F24F 11/0001 454/236 |
| 7,415,901 B2 * | 8/2008 | Desrochers | .............. | G01N 1/26 236/1 B |
| 7,657,161 B2 * | 2/2010 | Jeung | ................... | F04D 27/004 318/400.01 |
| 7,891,573 B2 * | 2/2011 | Finkam | ................... | F24F 11/001 236/1 C |
| 8,326,464 B2 * | 12/2012 | Clanin | ................. | F24F 11/0001 454/228 |
| 8,364,318 B2 * | 1/2013 | Grabinger | ............ | F24F 11/0001 454/256 |
| 8,918,218 B2 * | 12/2014 | Grabinger | ............ | F24F 11/0001 236/49.3 |
| 9,109,981 B2 * | 8/2015 | Sharp | .................... | G01N 1/2273 |
| 9,285,135 B2 * | 3/2016 | Gao | ..................... | F24F 11/0017 |
| 9,316,410 B2 * | 4/2016 | Meirav | ..................... | F24H 3/06 |
| 9,328,936 B2 * | 5/2016 | Meirav | ................ | F24F 11/0001 |
| 9,399,187 B2 * | 7/2016 | Meirav | ................ | F24F 3/0442 |
| 9,500,382 B2 * | 11/2016 | Grabinger | ............... | F24F 3/044 |
| 9,765,986 B2 * | 9/2017 | Thomle | .................. | F24F 11/006 |
| 2008/0139105 A1 * | 6/2008 | Kuentz | ................ | F24F 11/0079 454/238 |
| 2010/0286831 A1 * | 11/2010 | Boudreau | ............. | F24F 12/006 700/278 |

OTHER PUBLICATIONS

2012 International Mechanical code. International Code Council. "Fig A.pdf". Nov. 2014 [retreived on Nov. 7, 2018]. Retrieved from the internet <URL: https://codes.iccsafe.org/content/IMC2012/chapter-4-ventilation>.*

Wayback Machine. Electro Industries. Sep. 3, 2014 [retreived on Nov. 9, 2018]. Retrieved from the internet <URL: https://web.archive.org/web/20140903133417/http://www.electromn.com/gen/makeup_air_ii.htm>.*

* cited by examiner

ADAPTIVE MAKEUP AIR SYSTEM AND METHOD FOR TIGHT ENCLOSURES

RELATED APPLICATION

The present U.S. non-provisional patent application is related to and claims priority benefit of a prior-filed U.S. provisional patent application titled "Makeup Air System," Ser. No. 62/134,346, filed Mar. 17, 2015. The identified prior-filed application is hereby incorporated in its entirety by reference into the present application.

FIELD

The present invention relates to systems and methods for introducing makeup air into a building or other enclosure to compensate for exhaust air removed from the enclosure.

BACKGROUND

Exhaust systems may create problematic pressure differentials in tightly sealed buildings or other enclosures. For example, hood exhaust systems in residential kitchens can remove air at relatively high rates. Such high outflow rates combined with tight seals and little or no provisions for makeup air can depressurize enclosures and create situations in which the air pressure inside the enclosures is lower than the air pressure outside. This can lead to backdrafting of combustion appliances, introducing outdoor odors into the enclosures, reducing comfort by introducing drafts, increasing radon infiltration, creating operational issues for doors, and creating moisture and mold problems. Backdrafting is particularly problematic because it can result in an accumulation of hazardous combustion products such as carbon monoxide in the enclosure.

Makeup air replaces air removed by exhaust systems. Makeup air can be introduced naturally if the enclosure has sufficient openings for air to infiltrate. Such openings can take the form of seams in construction, gaps around windows and doors, chimneys, and appliance vent pipes. Relying on naturally infiltrating makeup air has several problems, including that the openings may exist in inconvenient locations and create uncontrollable drafts or introduce undesirable odors, the amount of makeup air is difficult to quantify without empirical testing, and the untempered makeup air may add heating and cooling loads to heating, ventilation, and air-conditioning (HVAC) systems that exceed the systems' capacities. Importantly, a reasonable pressure differential between inside and outside is below three pascals (3 Pa), and it may not be possible to infiltrate an adequate amount of makeup air at a sufficient pressure to counter the outflow rate.

Where an exhaust system is capable of exhausting air in excess of four hundred cubic feet per minute (400 CFM), or where the combination of outflow rate and insufficiency of natural air infiltration results in a pressure differential of greater than two pascals (2 Pa), then a makeup air system is needed to provide makeup air. Makeup air systems may be passive or forced. Passive systems typically rely on engineered openings (as opposed to naturally occurring cracks and holes) and have some advantages but can vary in performance depending on weather conditions outside the building enclosure (e.g., barometric pressure, wind, and temperature). Forced makeup air systems may introduce outside air into the central HVAC system which filters, conditions, and distributes it through existing ductwork, or may have their own distribution ductwork. Both options have advantages and disadvantages, and determining which is best and designing the system for a particular enclosure can be a complicated process. Further, existing forced makeup air systems simply switch on and off with the exhaust fan and without regard to whether the amount of makeup air being introduced is sufficient to compensate for the amount of air being removed.

This background discussion is intended to provide information related to the present invention which is not necessarily prior art.

SUMMARY

Embodiments of the present invention solve the above-described and other problems and limitations by providing a system and method for introducing compensatory makeup air into a building or other enclosure while an exhaust system is operating. Unlike prior art makeup air systems, the present invention does not simply switch on and off with the exhaust fan but rather seeks to approximately or exactly compensate for the amount of air being removed from the enclosure.

In one embodiment of the present invention, a makeup air system may be configured to introduce external air into an enclosure having an exhaust fan for removing internal air from the enclosure at an outflow rate. The makeup air system may broadly comprise a damper, a makeup air fan, a sensor, and a controller. The damper may be configured to open and close an air passage operable to direct the external air to enter the enclosure. The makeup air fan may be positioned in the air passage and configured to move the external air into the enclosure at an inflow rate. The sensor may be configured to measure a quantifiable characteristic which can be correlated with or is otherwise indicative of the outflow rate, and to communicate a signal representative of the quantifiable characteristic. The controller may be configured to receive the signal from the sensor, determine a speed of the makeup air fan based on the quantifiable characteristic that results in the inflow rate at least approximately matching the outflow rate, and open the damper and run the makeup air fan at the determined speed such that the inflow rate of external air into the enclosure at least approximately matches the outflow rate of internal air out of the enclosure.

In various implementations of this embodiment the sensor may be a current sensor configured to measure an amount of electrical current flowing to the exhaust fan, a pressure sensor configured to measure a pressure differential between an interior and an exterior of the enclosure, or a speed sensor configured to measure a speed of operation of the exhaust fan. The system may further include a user interface configured to allow for storing in a memory a low speed value received from the sensor when the exhaust fan is operating at a low speed, setting a low speed value for the makeup air fan at which the inflow rate approximately matches the outflow rate for the low speed value of the exhaust fan, storing in a memory a high speed value received from the sensor when the exhaust fan is operating at a high speed, and setting a high speed value for the makeup air fan at which the inflow rate approximately matches the outflow rate for the high speed value of the exhaust fan. Then, when the low speed value for the exhaust fan is received from the sensor the controller causes the makeup air fan to operate at its low speed value, when the high speed value for the exhaust fan is received from the sensor the controller causes the makeup air fan to operate at its high speed value, and when an intermediate value for the exhaust fan is received from the sensor the controller causes the makeup air fan to operate at a proportionally intermediate speed value.

In another embodiment of the present invention, a makeup air method may be configured to introduce external air into a building enclosure, wherein the enclosure has an exhaust fan for removing internal air from the building enclosure at an outflow rate. The method may broadly comprise the following steps. A signal may be received from a sensor configured to measure an amount of electrical current flowing to the exhaust fan, wherein the signal is representative of the amount of electrical current, and the amount of electrical current is indicative of the outflow rate. A low speed value received from the sensor when the exhaust fan is operating at a low speed may be stored in an electronic memory. A low speed value may be set for a makeup air fan at which the inflow rate approximately matches the outflow rate for the low speed value of the exhaust fan. A high speed value received from the sensor when the exhaust fan is operating at a high speed may be stored in the electronic memory. A high speed value may be set for the makeup air fan at which the inflow rate approximately matches the outflow rate for the high speed value of the exhaust fan. An electronic controller may control operation of a damper configured to open and close an air passage operable to direct the external air to enter the enclosure, and operation of a makeup air fan positioned in the air passage and configured to move the external air into the enclosure at an inflow rate. When the low speed value for the exhaust fan is received from the sensor the controller may cause the makeup air fan to operate at its low speed value, when the high speed value for the exhaust fan is received from the sensor the controller may cause the makeup air fan to operate at its high speed value, and when an intermediate value for the exhaust fan is received from the sensor the controller may cause the makeup air fan to operate at a proportionally intermediate speed value.

Various implementations of either or both of the foregoing embodiments may include any one or more of the following additional features. The makeup air fan may be an electronically commutated inline centrifugal fan. A heater may be positioned downstream of the damper and configured to temper the external air flowing through the air passage, and the controller may be further configured to control operation of the heater. Relatedly, the controller may be configured to delay starting the heater for a pre-determined delay period after opening the damper. An intake may extend through an exterior wall of the enclosure and connect to the air passage. A filter unit may be positioned in the air passage and may be configured to remove undesirable matter from the external air flowing through the air passage. A silencing unit may be configured to reduce a volume of noise generated by other components of the system during operation. Ductwork may be configured to extend the air passage directly into a particular area within the enclosure. Alternatively, ductwork may be configured to connect the air passage to an HVAC system. There may be a plurality of exhaust fans for removing internal air from the enclosure at a plurality of outflow rates, and a sensor may be associated with each one of the exhaust fans, and the controller may be configured to receive a plurality of signals from the plurality of sensors and run the makeup air fan at a speed such that the inflow rate of external air into the enclosure approximately matches a total of the plurality of outflow rates of internal air out of the enclosure.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, the present invention provides a system and method for introducing compensatory makeup air into a building or other enclosure while an exhaust system is operating. Unlike prior art makeup air systems, the present invention does not simply switch on and off with the exhaust fan but rather seeks to approximately or exactly compensate for the amount of air being removed from the enclosure. In more detail, the makeup air system monitors an exhaust fan in order to sense a quantifiable characteristic (e.g., electrical current, pressure, speed) of the exhaust fan or of the internal environment of the enclosure, which can be correlated with or is otherwise indicative of the outflow rate produced by the exhaust fan. The system then determines a corresponding speed of the makeup air fan based on the quantifiable characteristic that results in the inflow rate at least approximately matching the outflow rate, and runs the makeup air fan at the corresponding speed such that the inflow rate of external air into the enclosure at least approximately matches the outflow rate of internal air out of the enclosure. In addition to allowing the exhaust system to run at its intended capacity and reducing or eliminating the risk of depressurization, the makeup air system allows for the makeup air to be managed. In particular, because the makeup air is fan-forced, it can be filtered, tempered, and routed via ductwork to locations within the building enclosure where it is needed.

The exhaust system may be, for example, a hood exhaust system for removing air over a cooking appliance, a ceiling exhaust system for removing moist air from a bathroom, a boosted exhaust system for removing warm, moist air from a clothes dryer, or other powered exhaust system. Traditional exhaust systems are often intermittently operated, although the principles of the present invention are not limited to such systems. The exhaust fan used by the exhaust system may be, for example, a single speed, multi-speed, variable speed, or electronically commutated (EC) fan. Further, a large open fireplace can have a similar effect in pulling air out of the enclosure.

Figure 1:
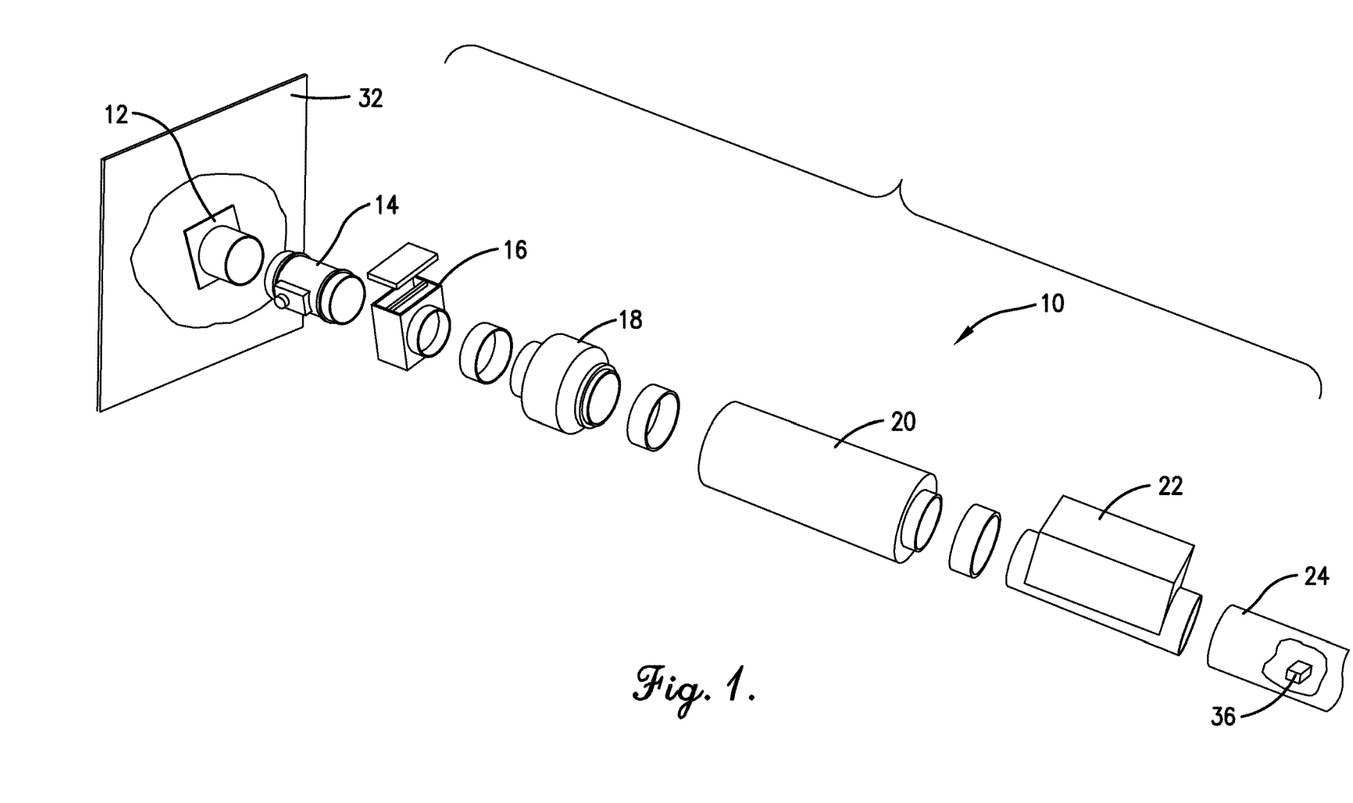
FIG. 1 is an exploded perspective view of an embodiment of a makeup air system of the present invention.
Figure 2:
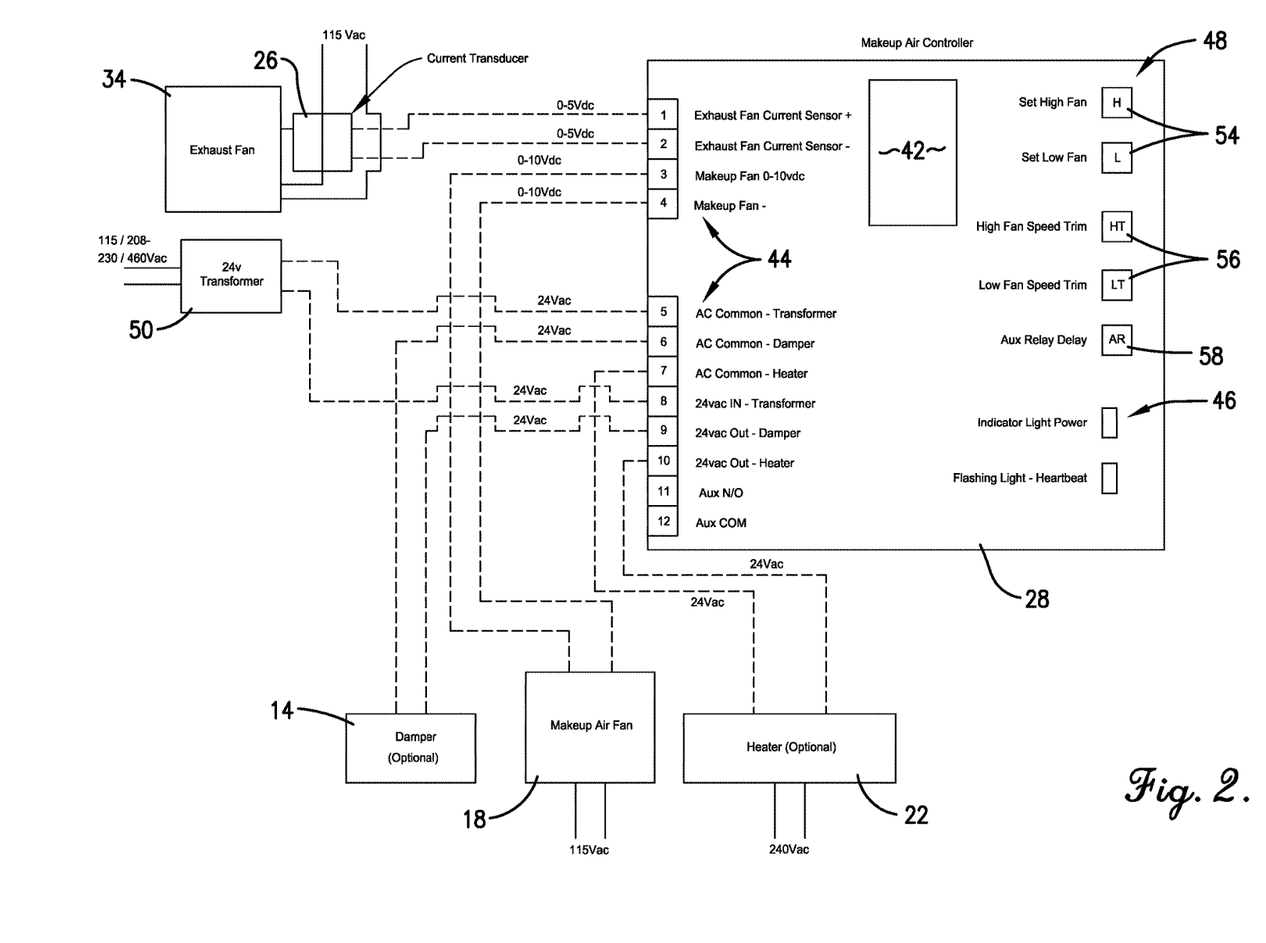
FIG. 2 is a high level block diagram for the makeup air system of FIG. 1.

Referring to FIGS. 1 and 2, an embodiment of the makeup air system 10 may broadly comprise an intake 12; a damper 14; a filter unit 16; a makeup air fan 18; a silencing unit 20; a heating unit 22; ductwork 24; an exhaust fan sensor 26; and a controller 28. The intake 12 may extend through an exterior wall 32 of the enclosure to provide access to external air. The damper 14 may be openable and closeable to selectively control the flow of the external air through an air passage defined by the system 10. In one implementation, the damper 14 may be motorized and substantially automatically controlled by the controller 28. The filter unit 16 may be configured to remove undesirable matter (e.g., dust, pollen) from the external air flowing through the air passage. In various implementations, the filter unit 16 may include replaceable or washable filter elements.

Figure 3:
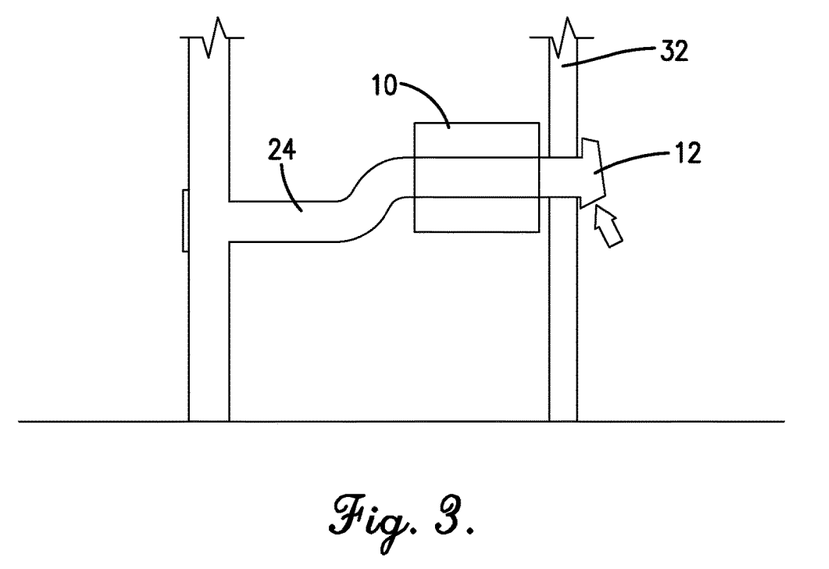
FIG. 3 is a cross-sectional side elevation view of a first installation of the makeup air system of FIG. 1 operating independent of a central HVAC system.
Figure 4:
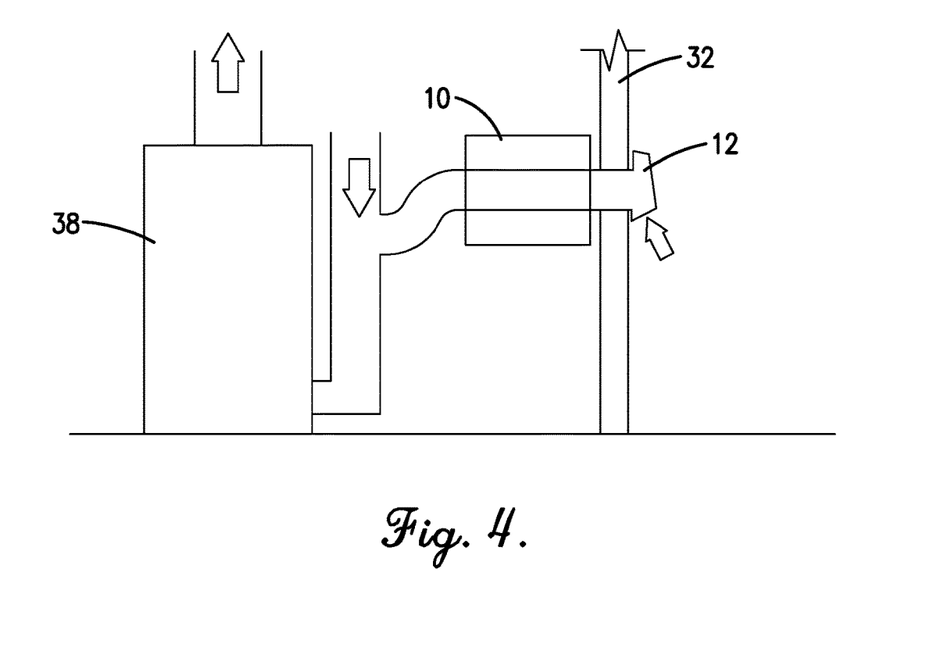
FIG. 4 is a cross-sectional side elevational view of a second installation of the makeup air system of FIG. 1 operating in combination with a central HVAC system.

The makeup air fan 18 may be configured to force the external air through the air passage at an inflow rate controlled by the controller 28. In various implementations, the fan 18 may be an inline centrifugal fan, and may be a single speed fan, a variable speed fan, or an EC fan configured to operate in single speed or variable speed modes depending on the type of the exhaust fan 34. The silencing unit 20 may be configured to reduce the volume of the noise generated by the system 10 during operation, including noise generated by the fan 18. In various implementations, the silencing unit 20 may or may not be included in the system 10. The heating unit 22 may be configured to temper the external air as it flows through the air passage. This may be particularly desirable during cold weather when the external air is especially cold and introducing it into the house without tempering might adversely impact the HVAC system's ability to maintain a stable temperature. In various implementations, the heating unit 22 may or may not be included in the system 10, may be an electric heater, and may include a downstream temperature sensor 36 to facilitate controlling operation of a heating element in order to achieve a minimum temperature for the external air as it flows through the air passage and into the enclosure. The ductwork 24 may be configured to route the external air either directly into the enclosure (e.g., at or near a kitchen or other area containing the exhaust fan 34), as seen in FIG. 3, or into an HVAC system 38 for subsequent delivery into the enclosure, as seen in FIG. 4.

The exhaust fan sensor 26 may be configured to generate a signal that is representative of a quantifiable characteristic (e.g., electrical current, pressure, speed) which can be correlated with or is indicative of the outflow rate produced by the exhaust fan 34. In one embodiment, the sensor 26 may be a current sensor configured to measure an amount of electrical current flowing to the exhaust fan 34, wherein the amount of current is indicative of the outflow rate of internal air being removed from the enclosure. In one implementation, the sensor 26 may be configured to generate a zero to five (0-5) VDC signal which is proportional to a current draw of the exhaust fan 34. Potentially suitable sensors may include, for example, Greystone CS-6XX series mini-current sensors. In various other implementations, the current sensor may be replaced or supplemented with one or more other types of sensors suitable for measuring other relevant factors. For example, a pressure sensor may be used to measure a pressure differential between the interior and the exterior of the building enclosure, or a speed sensor may be used to measure a speed of operation of the exhaust fan 34 which can then be correlated with the outflow rate of internal air.

Referring particularly to FIG. 2, the controller 28 may be configured to substantially automatically control operation of the damper 14, makeup air fan 18, and heater 22, based, at least in part, on the signal received from the exhaust fan sensor 26, in order to provide an inflow rate of external air to approximately or exactly compensate for the outflow rate of internal air. The controller 28 may be an electronic controller including a non-volatile electronic memory 42, an AC-to-DC converter (not shown), a plurality of digital and analog inputs and outputs 44, one or more light-emitting diodes (LEDS) 46, a user interface 48, and a transformer 50. The non-volatile memory 42 may be configured to store user set values. In one implementation, the memory may be configured to store two 10-bit user set values. The plurality of inputs and outputs 44 may include a first input for receiving the signal generated by the exhaust fan sensor 26, a first output for controlling the makeup air fan 18, a second input for receiving power from the transformer 50, and one or more second outputs for providing power to and/or otherwise controlling activation of the damper 14 and heater unit 22. The one or more LEDS 46 may be configured to indicate relevant operational information for the system 10, such as power, mode, and status.

The user interface 48 may be configured to allow for programming or otherwise configuring the controller 28, and may include a plurality of switches and settable input mechanisms. In various implementations, some or all of the switches may be momentary pushbuttons, and some or all of the settable input mechanisms may be potentiometers. For example, the plurality of switches and settable input mechanisms may include first and second momentary pushbuttons 54 for capturing in the memory 42 "high" and "low" amounts of electrical current flowing to the exhaust fan 34, and first and second single-turn potentiometers 56 for setting "high" and "low" makeup air fan speeds which correspond to the high and low amounts of current flowing to the exhaust fan 34. The user interface 48 may further include another settable input mechanism 58 for specifying a time delay between opening the damper 14 and starting the heater 22. Some or all of these user interface controls 54,56,58 may be partially or fully covered or otherwise physically protected against accidental adjustment. In one implementation, the exhaust fan sensor 26 provides a zero to five (0-5) VDC input to the controller 28 indicative of the amount of electrical current flowing to the exhaust fan 34. This input may have a minimum ten-bit resolution. The pushbuttons 54 allow for capturing this zero to five (0-5) VDC input value for both low and high speed operation of the exhaust fan 34. The potentiometers 56 allow for setting a zero to ten (0-10) VDC analog output for controlling both the low and high speed operation of the makeup air fan 18 in proportional response to the current flowing to the exhaust fan 34. This output may also have a minimum ten-bit resolution.

The transformer 50 may supply power to other components of the system 10, including at least the controller 28 and potentially also including the damper 14, fan 18, and heater 22. In various implementations, the transformer may supply twenty four (24) VAC, and may be located on, near, or remote from the controller 28.

In various implementations, the makeup air system 10 may operate in single speed or variable speed modes. In single speed mode, the exhaust fan 34 being monitored can only run at one specific speed. In this case, the makeup air system 10 may be configured as follows. With the exhaust fan 34 turned off, the "exhaust fan low speed setpoint" pushbutton is pushed causing the zero to five (0-5) VDC signal value from the current sensor 26 to be recorded in the memory 42. Because the exhaust fan 34 is off, the signal value will be zero (0) VDC, so when this value is set as the low speed setpoint, the system 10 knows that it is in single speed mode. The exhaust fan 34 is then turned on, and the "exhaust fan high speed setpoint" pushbutton is pushed causing the zero to five (0-5) VDC signal value from the current sensor 26 to be record in the memory 42. This value is used as a threshold to open the damper 14 and turn on the makeup air fan 18. The "makeup air fan high speed setpoint" potentiometer is adjusted so that the speed of the makeup air fan 18 is sufficient to introduce an amount of external air into the enclosure to approximately (e.g., within +/−ten (10) CFM) or exactly compensate for the amount of internal air removed the enclosure by the exhaust fan 34. For example, when the single speed exhaust fan 34 is on, the current sensor 26 may output a signal of four (4) volts, and in order to match the outflow rate of the exhaust fan 34, the controller 28 may send a signal of seven (7) volts to the makeup air fan 18.

In variable speed mode, the exhaust fan 34 being monitored can run at two or more different speeds. In this case, the makeup system 10 may be configured as follows. The exhaust fan 34 is turned on and set to its lowest speed setting. The "exhaust fan low speed setpoint" pushbutton is pushed causing the zero to five (0-5) VDC signal value from the current sensor 26 to be recorded in the memory 42. The "makeup air fan low speed setpoint" potentiometer is adjusted so that the speed of the makeup air fan 18 is sufficient to introduce an amount of external air into the building enclosure to approximately or exactly compensate for the amount of internal air removed the enclosure by the exhaust fan 34 running at low speed. The exhaust fan 34 is then set to its highest speed setting. The "exhaust fan high speed setpoint" pushbutton is pushed causing the zero to five (0-5) VDC signal value from the current sensor 26 to be recorded in the memory 42. The "makeup air fan high speed setpoint" potentiometer is adjusted so that the speed of the makeup air fan 18 is sufficient to introduce an amount of external air into the building enclosure to approximately or exactly compensate for the amount of internal air removed from the enclosure by the exhaust fan 34 running at high speed. Electrical current values between the exhaust fan low and high speed setpoints are assumed to correlate linearly with the amount of air being removed from the enclosure. Thus, a current value that is half-way between the exhaust fan low and high speed setpoints would result in the makeup air fan 18 being run at a speed that is half way between the makeup air fan low and high speed setpoints. For example, when a three-speed exhaust fan is running at low speed the current sensor 26 outputs a signal of one (1) volt, and at high speed it outputs a signal of three (3) volts. In order to match the outflow rates of the exhaust fan at these speeds, the controller 28 sends a signal of three (3) volts at the low end and eight (8) volts at the high end to the makeup air fan 18. When the exhaust fan 34 is running at medium speed, the current sensor 26 outputs a signal of two (2) volts, and the controller 28 sends a signal of five and one-half (5.5) volts to the makeup air fan 18.

In variable speed mode operation, when the current sensor 26 senses a value that is below the low speed setpoint on the zero to five (0-5) VDC input, the outputs controlling the damper 14 and heater 22 are off and the zero to ten (0-10) VDC output for the makeup air fan 18 is at zero (0) VDC. When the current sensor 26 senses a value that is equal to or above the low speed setpoint, the damper 14 is opened, the heater 18 is turned on (after a delay of one to thirty (1-30) seconds if a time delay value has been set), delay one second, and then turn on the makeup air fan 18 by activating the zero to (0-10) VDC fan output. The zero to ten (0-10) VDC fan output will vary linearly with the signal received from the current sensor 26 at the zero to five (0-5) VDC input. Thus, the makeup air fan 18 is driven by a signal that is proportional to the signal driving the exhaust fan 34 in order to match the volumetric inflow provided by the makeup air fan 18 with the outflow provided by the exhaust fan 34.

Figure 5:
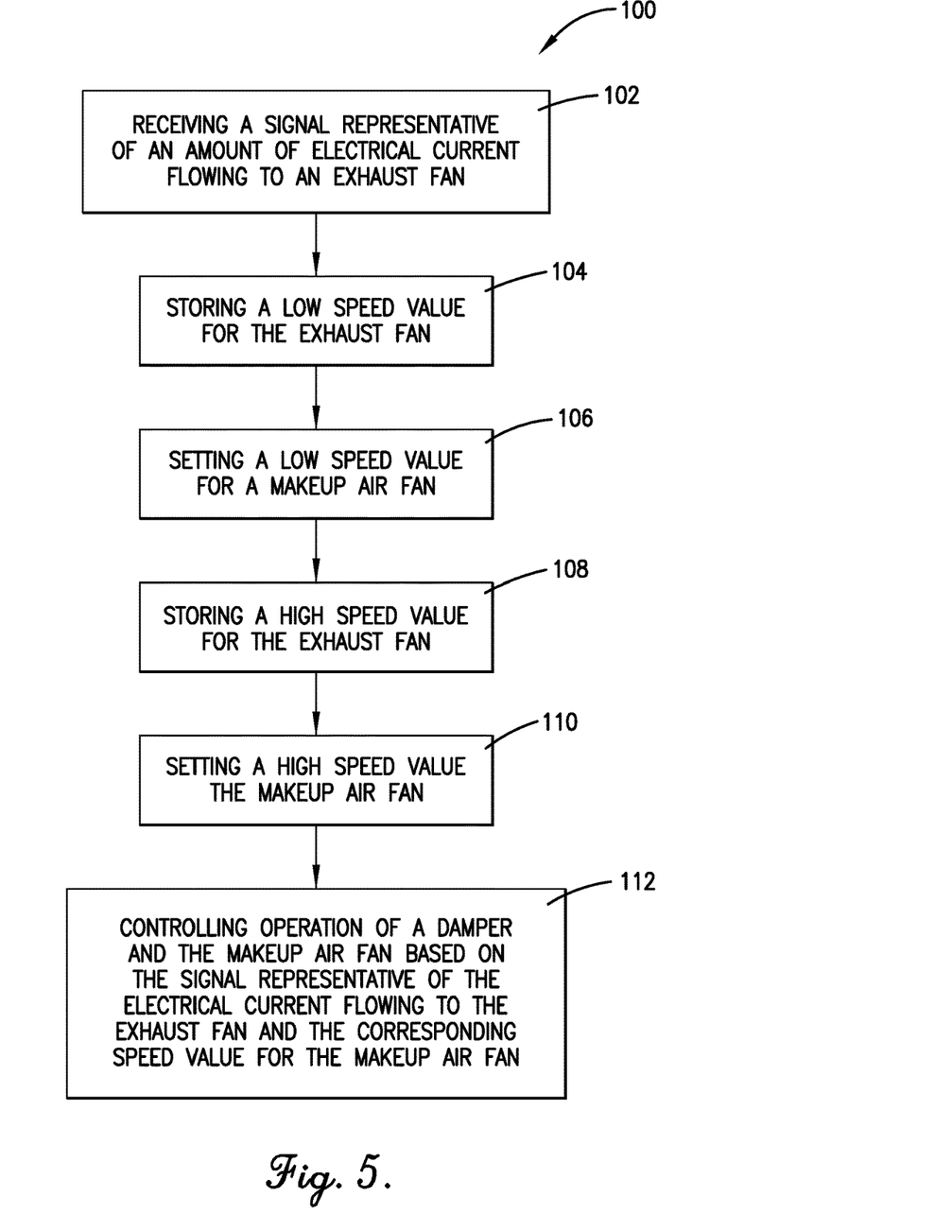
FIG. 5 is a flowchart of steps involved in an embodiment of a makeup air method of the present invention.

Referring also to FIG. 5, a method 100 of introducing external air into a building or other enclosure having the exhaust fan 34 for removing internal air from the enclosure at an outflow rate may broadly comprise the following steps. The signal may be received from the sensor 26 which may be configured to measure the amount of electrical current flowing to the exhaust fan 26, as shown in step 102, wherein the signal is representative of the amount of electrical current, and the amount of electrical current is indicative of the outflow rate. The low speed value is received from the sensor 26 and stored in the electronic memory 42 when the exhaust fan 34 is operating at low speed, as shown in step 104. A low speed value for a makeup air fan 18 may be set at which the inflow rate approximately matches the outflow rate for the low speed value of the exhaust fan 34, as shown in step 106. The high speed value is received from the sensor 26 and stored in the electronic memory 42 when the exhaust fan 42 is operating at a high speed, as shown in step 108. The high speed value for the makeup air fan 18 is set at which the inflow rate approximately matches the outflow rate for the high speed value of the exhaust fan 34, as shown in step 110. The electronic controller 28 may then control operation of the damper 14 and the makeup air fan 18, as shown in step 112, wherein when the low speed value for the exhaust fan 34 is received from the sensor 26 the controller 28 causes the makeup air fan 18 to operate at the low speed value for the makeup air fan 18, when the high speed value for the exhaust fan 34 is received from the sensor 26 the controller causes the makeup air fan 18 to operate at the high speed value for the makeup air fan 18, and when an intermediate value for the exhaust fan 34 is received from the sensor 34 the controller 28 causes the makeup air fan to operate at a proportionally intermediate speed value for the makeup air fan 18.

The makeup air system 10 may be expanded to accommodate any number of exhaust fans, including responding to their cumulative effects when running simultaneously. In one implementation, expansion may be achieved by adding a dedicated makeup air system for each of multiple exhaust fans. In another implementation, expansion may be achieved by modifying a single makeup air system to monitor and compensate for multiple exhaust fans simultaneously.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A makeup air system for introducing external air into an enclosure to minimize underpressurization of the enclosure, the enclosure having an exhaust fan for removing internal air from the enclosure at an outflow rate, the makeup air system comprising: a damper configured to open and close an air passage operable to direct the external air to enter the enclosure; a makeup air fan positioned in the air passage and configured to move the external air into the enclosure at an inflow rate; a sensor configured to measure a quantifiable characteristic of the exhaust fan which is indicative of the outflow rate, and to communicate a signal representative of the quantifiable characteristic; and a controller configured to receive the signal from the sensor, determine a speed of the makeup air fan based on the quantifiable characteristic that results in the inflow rate at least approximately matching the outflow rate, open the damper and run the makeup air fan at the determined speed such that the inflow rate of external air into the enclosure at least approximately matches the outflow rate of internal air out of the enclosure, and thereby minimize underpressurization of the enclosure.

2. The makeup air system as set forth in claim 1, wherein the makeup air fan is an electronically commutated inline centrifugal fan.

3. The makeup air system as set forth in claim 1, wherein the sensor is a current sensor configured to measure an amount of electrical current flowing to the exhaust fan.

4. The makeup air system as set forth in claim 1, wherein the sensor is a speed sensor configured to measure a speed of operation of the exhaust fan.

5. The makeup air system as set forth in claim 1, further including a heater positioned downstream of the damper and configured to temper the external air flowing through the air passage, and the controller being further configured to start the heater.

6. The makeup air system as set forth in claim 5, wherein the controller is configured to delay starting the heater for a pre-determined delay period after opening the damper.

7. The makeup air system as set forth in claim 1, further including an intake extending through an exterior wall of the enclosure and connected to the air passage for the external air to enter the enclosure.

8. The makeup air system as set forth in claim 1, further including a filter unit configured to remove undesirable matter from the external air flowing through the air passage.

9. The makeup air system as set forth in claim 1, further including a silencing unit configured to reduce a volume of noise generated by other components of the makeup air system during operation.

10. The makeup air system as set forth in claim 1, further including ductwork configured to extend the air passage directly into a particular area within the enclosure.

11. The makeup air system as set forth in claim 1, further including ductwork configured to connect the air passage to a heating, ventilation, and air conditioning system.

12. The makeup air system as set forth in claim 1, further including a user interface configured to allow for—
storing in a memory a low speed value received from the sensor when the exhaust fan is operating at a low speed;
setting a low speed value for the makeup air fan at which the inflow rate approximately matches the outflow rate for the low speed value of the exhaust fan;
storing in a memory a high speed value received from the sensor when the exhaust fan is operating at a high speed; and
setting a high speed value for the makeup air fan at which the inflow rate approximately matches the outflow rate for the high speed value of the exhaust fan,
wherein when the low speed value for the exhaust fan is received from the sensor the controller causes the makeup air fan to operate at the low speed value for the makeup air fan, when the high speed value for the exhaust fan is received from the sensor the controller causes the makeup air fan to operate at the high speed value for the makeup air fan, and when an intermediate value for the exhaust fan is received from the sensor the controller causes the makeup air fan to operate at a proportionally intermediate speed value for the makeup air fan.

13. The makeup air system as set forth in claim 1, wherein there are a plurality of exhaust fans for removing internal air from the enclosure at a plurality of outflow rates, and the makeup air system includes a plurality of sensors, with each sensor being associated with one of the exhaust fans, and the controller is configured to receive a plurality of signals from the plurality of sensors and run the makeup air fan at a speed such that the inflow rate of external air into the enclosure approximately matches a total of the plurality of outflow rates of internal air out of the enclosure.

14. A makeup air system for introducing external air into a building enclosure to minimize underpressurization of the building enclosure, the building enclosure having an exhaust fan for removing internal air from the building enclosure at an outflow rate, the makeup air system comprising: an intake extending through an exterior wall of the building enclosure and connected to an air passage operable to direct the external air to enter the building enclosure; a damper configured to open and close the air passage; a heater positioned downstream of the damper and configured to temper the external air flowing through the air passage; a filter unit configured to remove undesirable matter from the external air flowing through the air passage; a makeup air fan positioned in the air passage and configured to move the external air into the enclosure at an inflow rate; a sensor configured to measure an amount of electrical current flowing to the exhaust fan and to communicate a signal representative of the amount of electrical current, wherein the amount of electrical current is indicative of the outflow rate; and a controller configured to receive the signal from the sensor, open the damper, start the heater, run the makeup air fan at a speed such that the inflow rate of external air into the enclosure approximately matches the outflow rate of internal air out of the enclosure, and thereby minimize underpressurization of the building enclosure.

15. The makeup air system as set forth in claim 14, further including a user interface configured to allow for—
storing in a memory a low speed value received from the sensor when the exhaust fan is operating at a low speed;
setting a low speed value for the makeup air fan at which the inflow rate approximately matches the outflow rate for the low speed value of the exhaust fan;
storing in a memory a high speed value received from the sensor when the exhaust fan is operating at a high speed; and
setting a high speed value for the makeup air fan at which the inflow rate approximately matches the outflow rate for the high speed value of the exhaust fan,
wherein when the low speed value for the exhaust fan is received from the sensor the controller causes the makeup air fan to operate at the low speed value for the makeup air fan, when the high speed value for the exhaust fan is received from the sensor the controller causes the makeup air fan to operate at the high speed value for the makeup air fan, and when an intermediate value for the exhaust fan is received from the sensor the controller causes the makeup air fan to operate at a proportionally intermediate speed value for the makeup air fan.

16. A method of introducing external air into a building enclosure to minimize underpressurization of the building enclosure, the building enclosure having an exhaust fan for removing internal air from the building enclosure at an outflow rate, the method comprising: receiving a signal from a sensor configured to measure an amount of electrical current flowing to the exhaust fan, wherein the signal is representative of the amount of electrical current, and the amount of electrical current is indicative of the outflow rate; storing in an electronic memory a low speed value received from the sensor when the exhaust fan is operating at a low speed; setting a low speed value for a makeup air fan at which the inflow rate approximately matches the outflow rate for the low speed value of the exhaust fan; storing in the electronic memory a high speed value received from the sensor when the exhaust fan is operating at a high speed; setting a high speed value for the makeup air fan at which the inflow rate approximately matches the outflow rate for the high speed value of the exhaust fan; and controlling with an electronic controller operation of a damper configured to open and dose an air passage operable to direct the external aft to enter the building enclosure, and operation of the makeup aft fan positioned in the air passage and configured to move the external air into the building enclosure at the inflow rate, thereby minimizing underpressurization of the building enclosure, wherein when the low speed value for the exhaust fan is received from the sensor the controller causes the makeup aft fan to operate at the low speed value for the makeup aft fan, when the high speed value for the exhaust fan is received from the sensor the controller causes the makeup air fan to operate at the high speed value for the makeup air fan, and when an intermediate value for the exhaust fan is received from the sensor the controller causes the makeup air fan to operate at a proportionally intermediate speed value for the makeup air fan.

17. The method as set forth in claim 16, further including providing a heater positioned downstream of the damper and configured to temper the external air flowing through the air passage, and controlling with the electronic controller operation of the heater.

18. The method as set forth in claim 16, further including extending with ductwork the air passage directly into a particular area within the building enclosure.

19. The method as set forth in claim 16, further including connecting with ductwork the air passage to a heating, ventilation, and air conditioning system.

\* \* \* \* \*